(12) United States Patent
Grandjean et al.

(10) Patent No.: US 8,062,619 B2
(45) Date of Patent: Nov. 22, 2011

(54) PROCESS AND DEVICE FOR DESULFURIZATION OF A GAS, COMPRISING A STAGE FOR ELIMINATION OF SULFUR BY COOLING A GAS STREAM

(75) Inventors: Julien Grandjean, Lyons (FR); Nicolas Ferrando, Suresnes (FR); Abdelhakim Koudil, Lyons (FR); P-Louis Carrette, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 12/697,642

(22) Filed: Feb. 1, 2010

(65) Prior Publication Data

US 2010/0196240 A1 Aug. 5, 2010

(30) Foreign Application Priority Data

Feb. 2, 2009 (FR) .................... 09 00451

(51) Int. Cl.
 *C01B 17/04* (2006.01)
 *C01B 17/05* (2006.01)
(52) U.S. Cl. .................. 423/573.1; 423/574.1; 423/575; 423/576.2
(58) Field of Classification Search ............... 423/573.1, 423/574.1, 575, 576.2; 422/168
See application file for complete search history.

(56) References Cited

U.S. PATENT DOCUMENTS

| 2,876,071 | A | 3/1959 | Updegraff |
| 4,391,791 | A | 7/1983 | Palm et al. |
| 4,601,330 | A | 7/1986 | Palm et al. |
| 5,807,410 | A | 9/1998 | Borsboom et al. |
| 5,951,961 | A | 9/1999 | Viltard et al. |
| 6,210,454 | B1 * | 4/2001 | Viltard et al. ............... 48/127.9 |
| 6,413,488 | B1 * | 7/2002 | Smith et al. ............... 423/574.1 |

FOREIGN PATENT DOCUMENTS

| EP | 1902769 A1 | 3/2008 |
| FR | 2753395 A1 | 3/1998 |
| FR | 0900451 R | 9/2009 |

* cited by examiner

*Primary Examiner* — Timothy Vanoy
(74) *Attorney, Agent, or Firm* — Millen, White, Zelano & Branigan, P.C.

(57) ABSTRACT

A process and apparatus for the treatment of a gas that contains hydrogen sulfide and sulfurous anhydride, in which: a) the gas (3) contacts with an organic solvent (1) containing a catalyst in a gas-liquid reactor-contactor (2) so as to recover separately liquid sulfur and; a gas effluent containing sulfur vapor; subjecting the gas effluent to a first condensation zone (7) operating at 70-100° C. to deposit the sulfur in solid form on sufficiently cold walls of the equipment in zone (7), recovering resultant purified gas containing less than 30 ppm by volume of sulfur melting the deposited solid sulfur to regenerate the equipment, and recycling resultant liquefied sulfur to the reactor contactor.

7 Claims, 4 Drawing Sheets

PROCESS AND DEVICE FOR DESULFURIZATION OF A GAS, COMPRISING A STAGE FOR ELIMINATION OF SULFUR BY COOLING A GAS STREAM

This invention has as its object a process and a device for treating a gas effluent of a Claus unit or a gas that contains hydrogen sulfide and sulfurous anhydride.

It relates more particularly to the treatment of effluents of Claus units that are obtained in particular from units for hydrodesulfurization and catalytic cracking. It also relates to the purification treatment of natural gas.

Various methods can be used to eliminate the hydrogen sulfide and the sulfurous anhydride that are contained in a gas to be treated. These methods are described in, for example, the patent applications FR-A-2 411 802 and FR-A-2 336 163.

The Claus process is widely used to recover the elementary sulfur from gas feedstocks that contain hydrogen sulfide ($H_2S$). However, the smoke that is emitted by the Claus-type unit installations contains, even after several catalytic stages, significant quantities of acid gases. It is then necessary to treat these effluents or tail gases of Claus units (referred to as "tail gas" according to English terminology) to eliminate the majority of toxic compounds so as to comply with anti-pollution standards. These standards are becoming increasingly strict, and it is necessary to improve existing technology continuously.

It is known, for example, to recover, starting from a Claus unit, approximately 95% by weight of elementary sulfur that is present; a treatment of this Claus unit effluent (by a Clauspol unit, for example) makes it possible to reach, for example, 99.8% by weight of elementary sulfur that is recovered from the reaction:

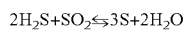

$$2H_2S + SO_2 \leftrightarrows 3S + 2H_2O$$

which implements a reaction medium that consists of an organic solvent and a catalyst comprising an alkaline or alkaline-earth salt of an organic acid. The reaction is carried out in general in counter-current in a reactor-contactor, and its temperature is monitored by passage of the solvent that has been withdrawn at the lower end of the reactor by a circulation pump into a heat exchanger, so as to promote conversion into sulfur while preventing the formation of solid sulfur. The sulfur is therefore recovered in liquid form. The process, although very efficient, is limited by different constraints:

The thermodynamic balance of the reaction is such that the reaction is never complete. Hydrogen sulfide and sulfur dioxide remain in equilibrium with the sulfur and the water that are formed. Typically, the quantity of elementary sulfur that is present in the $H_2S$ and $SO_2$ that have not reacted and that is found in the reaction effluent (of Clauspol) corresponds to approximately 0.2% by weight of the total sulfur of the initial feedstock of the Claus unit. A better conversion can be envisioned at a lower operating temperature, but this temperature should be kept above the solidification point of sulfur (approximately 120° C.); otherwise, the reactor would be clogged by the solid sulfur;

The presence of liquid sulfur that is not separated in the reactor-contactor, which is entrained in the solvent and the catalyst that circulate, and that is recycled in the reactor-contactor. Actually, all of the droplets of liquid sulfur are not separated from the solvent. The presence of liquid sulfur and of sulfur-saturated solvent irremediably bring the presence of gaseous sulfur into the effluent, due to the vapor pressure of sulfur. For example, the quantity of unrecovered sulfur that can be attributed to its vapor pressure is from about 0.1% to 0.2% by weight of sulfur of the initial feedstock.

According to the process that is disclosed in French Patent FR 2 753 395, it is possible to improve in particular the recovery rate of sulfur by treating the gas effluent at the output of the reactor-contactor. The treatment consists in cooling the gas effluent by at least one solvent in a cooling zone so as to obtain a suspension of sulfur crystals. The sulfur-enriched suspension is separated from the solvent and the gas in a separation zone, the gas that essentially does not contain more sulfur vapor is discharged into the atmosphere, and the sulfur-poor solvent is recycled in the cooling zone.

This process has drawbacks that are linked to the implementation of the cooling zone and the separation zone that can involve problems of a loss of pressure because of the accumulation of sulfur crystals in the equipment where the separation is carried out. Furthermore, the pumping of the sulfur-loaded suspension at the bottom of the separation equipment can be problematic.

The applicant discovered that it was possible to improve the elimination of the hydrogen sulfide and sulfurous anhydride that are contained in a gas to be purified, in particular a Claus unit tail effluent, and jointly to improve the recovery rate of liquid sulfur in the decanting zone of the reactor-contactor. "Liquid sulfur" is defined as the sulfur that can effectively be liquid because the temperature is beyond the melting point or partially in solid form in suspension in the liquid phase that essentially consists of solvent.

The object of the invention is a process for treatment of a gas that contains hydrogen sulfide and sulfurous anhydride in which:

a) The gas (3) is brought into contact with an organic solvent (1) that contains a catalyst in at least one gas-liquid reactor-contactor (2); a gas effluent that contains vapor sulfur and liquid sulfur is recovered separately, b) Said gas effluent is introduced into a first condensation zone (7) that operates at a temperature of between 70 and 100° C. so that the sulfur that is contained in said gas effluent is deposited in solid form on the so-called cold walls of the equipment of the zone (7), c) When the clogging limit of said equipment of zone (7) is reached, said equipment is regenerated so as to melt the solid sulfur that is deposited inside said equipment to obtain a liquid effluent, d) Said liquid effluent is recycled in the reactor-contactor, e) A purified gas is extracted from the zone (7).

One advantage of the invention is to be able to satisfy the strictest standards of combating atmospheric pollution by sulfur compounds by reducing the quantity of sulfur discharged into the atmosphere during the incineration of the gas and by maximizing the rate of recovery of sulfur in the decanting zone of the reactor-contactor.

Another advantage is to be able to modify the existing installations that use a Claus unit and a unit for treating effluents of said unit (Clauspol unit) at a very low cost.

DETAILED DESCRIPTION

FIGS. 1 to 4 describe different devices that allow the implementation of the invention wherein:

Figure 1:
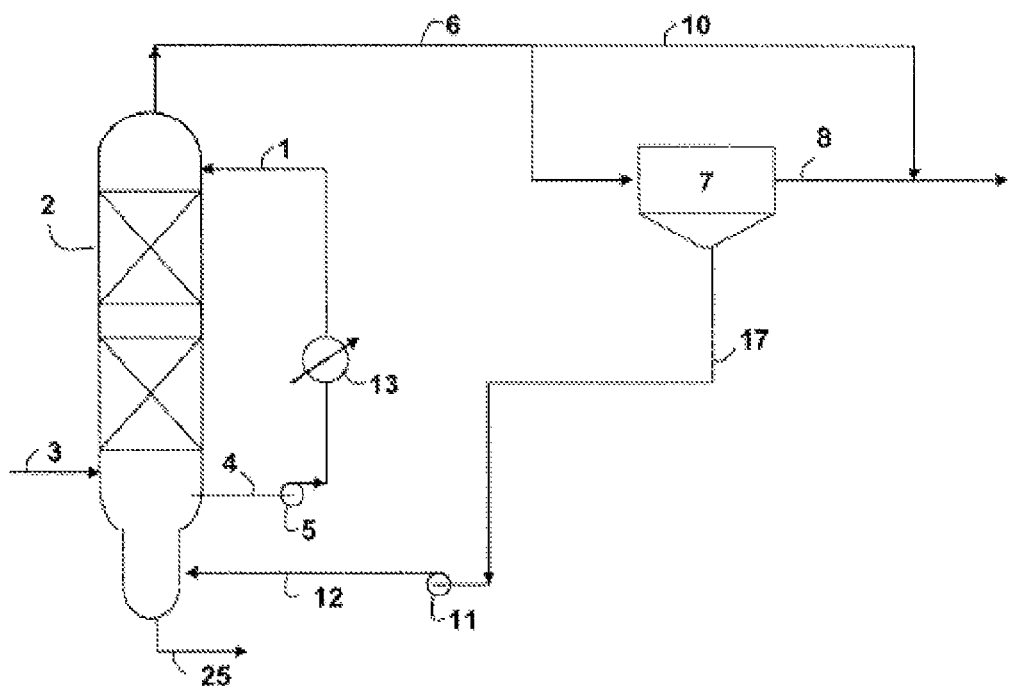
FIG. 1 is a schematic flowsheet of one aspect of the invention wherein the purified gas drawn off the reactor is introduced into one condenser.

The detailed description of the invention is given with reference to FIGS. 1 to 4.

The invention has as its object a process for treating a gas that contains hydrogen sulfide and sulfurous anhydride in which:

a) The gas (3) is brought into contact with an organic solvent (1) that contains a catalyst in at least one gas-liquid reactor-contactor (2); a gas effluent that contains vapor sulfur and liquid sulfur is recovered separately, b) Said gas effluent is introduced into a first condensation zone (7) that operates at a temperature of between 70 and 100° C. so that the sulfur that is contained in said gas effluent is deposited in solid form on the so-called cold walls of the equipment of the zone (7), c) When the clogging limit of said equipment of zone (7) is reached, said equipment is regenerated so as to melt the solid sulfur that is deposited inside said equipment to obtain a liquid effluent, d) Said liquid effluent is recycled in the reactor-contactor, e) A purified gas is extracted from the zone (7).

In stage e), the purified gas advantageously contains less than 30 ppm by volume of sulfur.

The process according to the invention and its means of implementation can be adapted to the conventional process and device for treatment of gas effluents of Claus units.

In a more detailed manner, said reactor-contactor (2) can contain one or more gas-liquid contact zones and generally comprises a heat exchanger or equivalent heating means in its lower part and more specifically in its decanting zone. It is possible to introduce there at least a portion of the sulfur that is recovered in the separation zone (7) and to withdraw the liquid sulfur from said decanting zone of the reactor-contactor. The temperature in the reactor-contactor is kept above the melting point of the sulfur, between 120 and 150° C., and preferably between 120 and 125° C. The pressure of the gas at the input of the reactor is generally between 0.10 and 0.15 MPa, preferably between 0.10 and 0.11 MPa. As described in the French Patent Application FR 2 753 396 of the applicant, the organic solvent can be recycled at the top of the reactor. The temperature at the output of the heat exchanger is then 1 to 2° C. less than that of the bottom of the reactor. The implementation of the reactor-contactor can be carried out, for example, according to two variants, in a vertical reactor:

Either a contact of the gas to be treated and the solvent is performed in co-current.

In this case, the gas to be treated is introduced at the top of the reactor-contactor as well as the recycled solvent that is obtained from a lateral draw-off in the lower part of the reactor. The gas effluent is also drawn off laterally, above the solvent to be recycled, in the lower part of the reactor.

Or a contact of the gas to be treated and the solvent is performed in counter-current.

In this case, the gas to be treated is introduced laterally into the lower part of the reactor-contactor, the solvent that is obtained from the lower part of the reactor is recycled laterally in the upper part, the sulfur is recovered at the bottom of the reactor, while the gas effluent that is designed to be cooled is drawn off at the top.

Regardless of the implementation, the ratio between the volumetric flow rate of gas and the volumetric flow rate of recycled organic solvent is between 10 and 40.

The process could also be implemented, however, in a horizontal reactor.

The catalysts and solvents that are generally used are those that are described in, for example, the patents FR 2 115 721 (U.S. Pat. No. 3,796,796), FR 2 122 674 and FR 2 138 371 (U.S. Pat. No. 3,832,454) that are incorporated as references. The most used solvents are the mono- or polyalkylene glycols, the mono- or polyalkylene glycol esters, or the mono- or polyalkylene glycol ethers. The catalysts that are used are usually those that are described in these same patents and more particularly the alkaline salts of weak organic acids such as benzoic acid and salicylic acid.

As described in the French Patent Application FR 2 753 396 of the applicant, the organic solvent can be recycled in the reactor-contactor after passage of the latter into a cooling stage.

According to the process of the invention, after treatment of the solvent in the reactor-contactor, the purified gas (effluent) essentially contains water and vapor sulfur. It is introduced into a condensation zone (7) in which it is cooled to a temperature that is generally between 70 and 100° C. (stage b), and preferably between 75 and 85° C. Condensation zone is defined as a condenser with indirect contact into which the effluent is introduced.

The cooling is ensured by a cooling fluid that preferably circulates in counter-current to the gas effluent, by means of, for example, a tubular exchanger or a plate exchanger in counter-current. The term "indirect contact" means that the gas is not in direct contact with the cooling fluid.

The wall temperature of the cold side of the condenser is kept higher than the dew point of the water vapor contained in the gas effluent. So as to minimize the pressure loss, the gas effluent circulates in the side of the exchanger offering the lowest pressure loss, for example the calender side in a tubular exchanger. Advantageously, the cooling fluid that is used is the cooling water that exits from the exchanger (13) that ensures the cooling of the solvent that is extracted from the reactor-contactor before its recycling directly into the latter.

The solidification of the sulfur upon contact with the cold wall of the condenser brings about the increase of the pressure loss on the part of the gas effluent and requires a regeneration phase that makes it possible to melt the sulfur again that is deposited on the walls of said condenser before sending it to the decanting zone of the gas-liquid reactor-contactor.

This regeneration phase (stage c) is triggered when the clogging limit of the condenser is reached, i.e., when the pressure loss in the condenser on the part of the gas effluent reaches a limit value of between 10 and 200 mbar, preferably between 10 and 100 mbar, and even more preferably between 10 and 30 mbar.

Preferably, a second condensation zone (9) is implemented and operates in parallel and alternately with the zone (7) when the latter is in the regeneration phase, and vice versa. Even if it is entirely possible to operate with a single condensation zone, it is preferable, from an operational flexibility standpoint, to use two condensation zones.

For said second zone, the regeneration phase is also engaged when the pressure loss on the part of the gas effluent reaches a value of between 10 and 200 mbar, preferably between 10 and 100 mbar, and even more preferably between 10 and 30 mbar. Furthermore, the second condensation zone is operated under the same temperature conditions as zone (7).

The fluid that is used in the condensation zone is preferably the one that is used for cooling the solvent that is extracted, cooled, and then recycled in the reactor-contactor, whereby said fluid is most often water.

Regarding stage c) for regeneration of the cooling zone, the latter is preferably operated by using a fraction of the hot solvent that is extracted from the reactor-contactor. This fraction generally represents 0.2 to 10% by volume of the entire solvent, preferably 1 to 2%.

According to the figures, a vertical gas-liquid reactor-contactor (2) receives—via feed line (3)—a gas that contains $H_2S$ and $SO_2$, whereby the gas is, for example, an effluent from a Claus unit. This reactor generally contains two packing beds, Intalox™ saddles, for example, having the property of retaining sodium salts formed during the reaction. An organic solvent that contains a soluble catalyst that is fed via a line (1), whereby said solvent is obtained from the reactor-contactor (2) via the line (4), a pump (5) and an exchanger (13), is introduced via a line (1) into said reactor-contactor in such a way that the contact of the gas to be treated and the solvent is carried out in counter-current.

The purified gas is drawn off from the reactor via a line (6) at the top of the reactor while the sulfur that is formed is drawn off at the bottom of the reactor via the line (25).

The gas that is partially purified but that also contains in general 300 to 500 ppm by volume of sulfur in vapor form is then introduced into a condenser with indirect contact (7) or (9), in which the cooling water that circulates in counter-current ensures the cooling of the gas effluent between 70 and 100° C., preferably between 75 and 85° C. The vapor sulfur is condensed in the solid state on the cold surface of the condenser. The purified gas that exits from the contactor (7) or (9) respectively via the lines (8) and (16) contains a residual sulfur content that is less than 30 ppm by volume. This gas is usually sent to an incinerator that transforms the residual sulfur radicals into sulfur dioxide.

According to a first embodiment as described by FIG. 1, when the pressure loss between the input and the output of the condenser (7) reaches a threshold that is generally between 10 and 200 mbar, preferably between 10 and 100 mbar, and even more preferably between 10 and 30 mbar, the exchanger is bypassed via the line (10), which returns to directly send the partially purified gas from the line (6) to the line (8) by means of the line (10).

The bypass of the condenser is achieved over a fairly short period, typically one to two hours, so that the overall yield of recovery of the elementary sulfur from the process is not affected. During this time, the cleaning of the condenser and the recovery of sulfur are initiated according to one of the methods that will be described below using FIGS. 3 and 4. The liquid sulfur that is recovered inside the condenser (7) is then conveyed using a pipe (17) and a pump (11) and then reintroduced via the line (12) into the decanting zone of the reactor-contactor (2).

Figure 2:
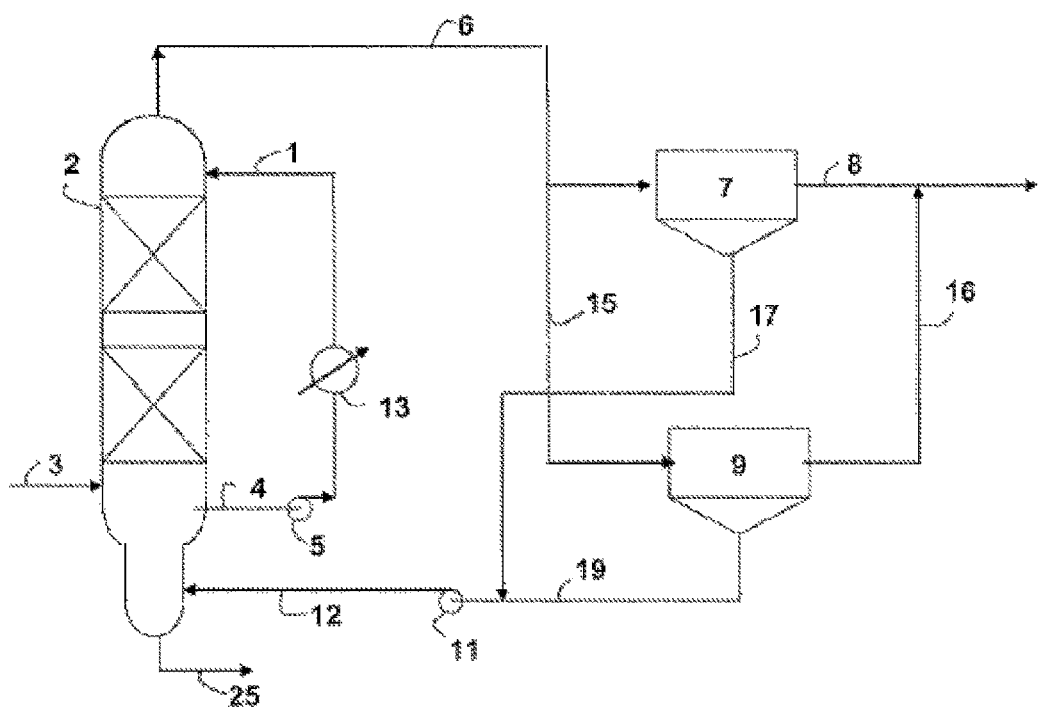
FIG. 2 is a schematic flowsheet which differs from FIG. 1 by the presence of a second condenser.

According to a preferred embodiment as described by FIG. 2, two cooling zones (7) and (9) operate alternately in parallel. Thus, when the clogging limit of the zone (7) is reached, because of the sulfur that is deposited inside, the gas that is to be treated is sent via a line (15) to the zone (9) that operates instead of zone (7) for cooling the gas to be treated, and the condenser (7) passes into the cleaning phase (regeneration). The sulfur concentration in the gas stream of output (8) or (16) thus always remains equal to the vapor pressure at the outlet temperature of the cooling zone in operation, or less than 30 ppm by volume. In a way that is identical to that for the condenser (7), when the pressure loss at the level of the condenser (9) reaches a limit value of between 10 and 200 mbar, preferably between 10 and 100 mbar, and even more preferably between 10 and 30 mbar, its operation is interrupted, and it passes into a cleaning phase, and the gas that is to be treated that is contained in the line (6) is admitted into the condenser (7). As described in the case of the first embodiment, the liquid sulfur that is obtained in the regeneration phase is sent to the reactor-contactor via the line (17) or (19).

Figure 3:
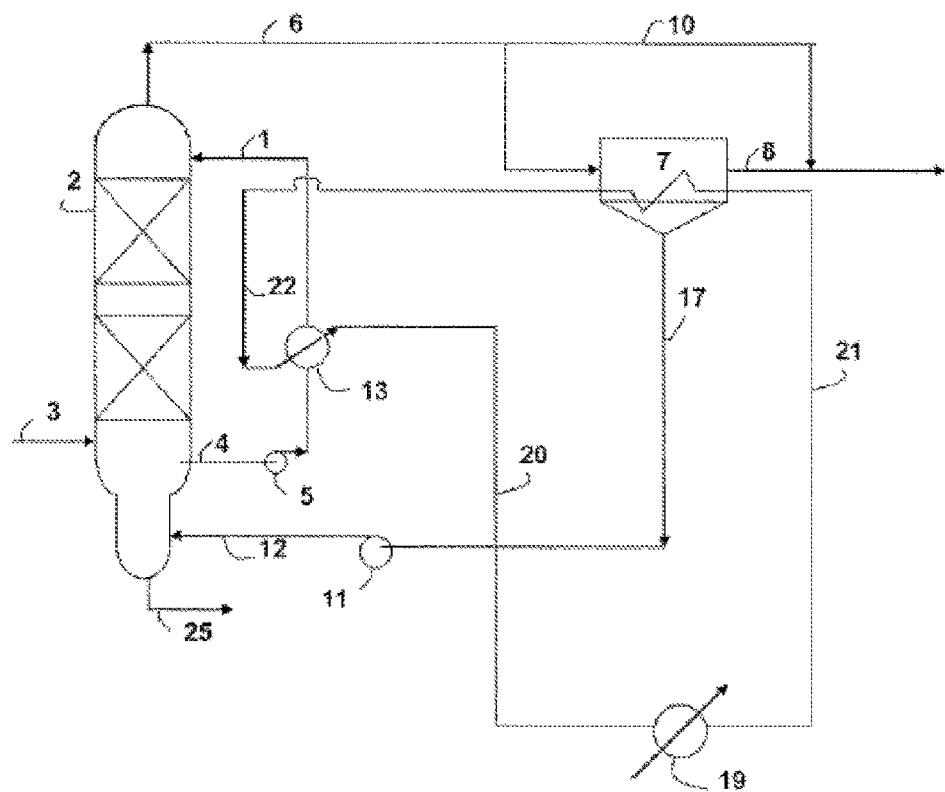
FIG. 3 is a schematic flowsheet which differs from FIG. 1 by the presence of a second exchanger.

According to another embodiment as described in FIG. 3, the cooling water of the exchanger (13), which makes it possible to cool the solvent that is extracted from the reactor-contactor before its recycling in the latter, is conveyed using a pipe (20), is cooled in an exchanger (19) and is sent via a line (21) to the condenser (7) to ensure the condensation of the sulfur inside the latter. The water is then sent to the input of the exchanger (13) via a line (22).

This embodiment is described in the case of the condenser (7) but can also be applied to the condenser (9).

Figure 4:
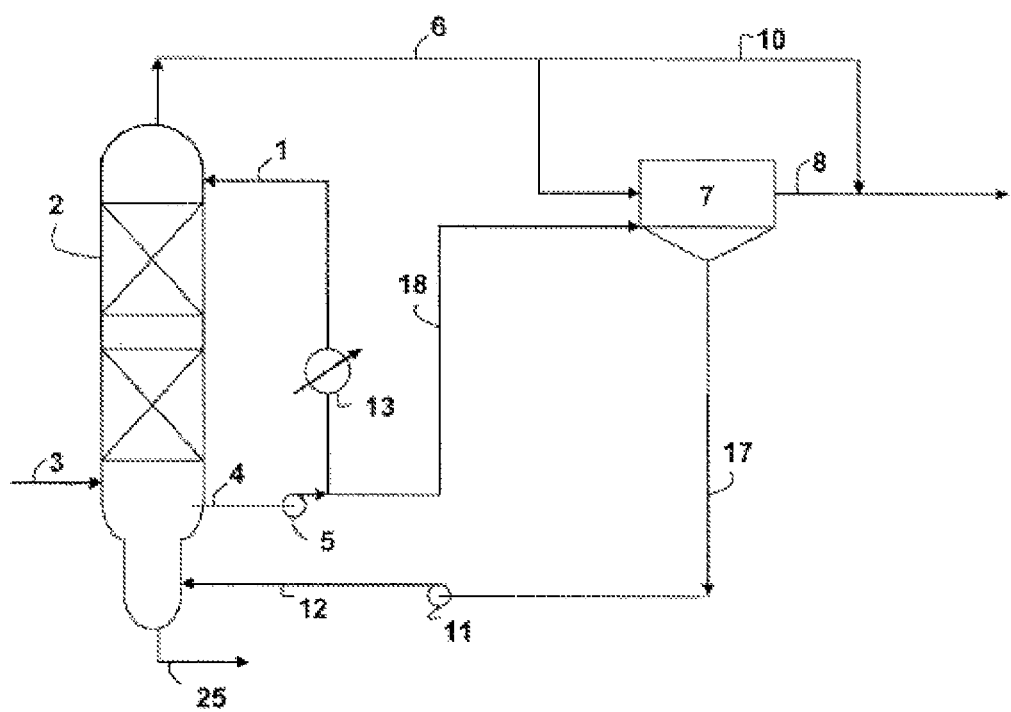
FIG. 4 is a schematic flowsheet which differs from FIG. 1 by the presence of a supplementary line in which a fraction of a hot solvent extracted from the reactor—contact or circulate.

For all of the embodiments of the invention that are described above, when the clogging limit of the condenser (7) or the condenser (9) is reached, i.e., when the pressure loss of the gas effluent that passes through one of these pieces of equipment reaches a limit value of between 10 and 200 mbar, preferably between 10 and 100 mbar, and even more preferably between 10 and 30 mbar, the sulfur that has accumulated in the condenser is recovered according to one of the following means:

According to a preferred method of operation illustrated by FIG. 4 in the case of the condenser (7), a fraction of the hot solvent that is extracted from the reactor-contactor via a line (4) and a pump (5) is sent via a line (18) into the condenser (7), which makes it possible to partially or totally melt the solid sulfur that is deposited inside the latter. A sulfur-enriched solvent effluent is then conveyed using a line (17) and a pump (11) and is reintroduced via a line (12) into the decanting zone of the reactor-contactor (2).

The regeneration is described above for the condenser (7) but can also be applied to the condenser (9).

According to another method of operation (not shown), the condenser (7) or (9) is heated by the vapor that circulates in the condenser alternately with the coolant. The solid sulfur that has accumulated in the condenser is thus melted before being recycled in the decanting zone of the reactor-contactor.

Example

According to the diagram that is presented in FIG. 2, a Claus unit tail gas whose flow rate is 12,300 $Nm^3/h$ is introduced via a line (3) into a vertical reactor-contactor that consists of a column (2), and it is brought into contact at 125° C. with an organic solvent that contains a soluble catalyst that is introduced via a line (1).

The packing that is used in the example consists of 2 saddle beds ("Intalox" made of ceramic with a specific surface area of 250 $m^2/m^3$) and having the property of retaining small quantities of sodium salts formed during the reaction.

The organic solvent that is used is a polyethylene glycol with a molecular weight of 400, and the soluble catalyst is sodium salicylate at a concentration of 100 millimol/kg of solvent.

The solvent is recycled between the bottom and the top of the reactor-contactor via the lines (4) and (1) at a flow rate of 500 $m^3/h$, using the circulation pump (5), after passage into a heat exchanger (13). The temperature of the recycled solvent is 123° C. The purified gas whose flow rate is 12,219 $Nm^3/h$ is extracted from the reactor via the line (6). The vapor sulfur content in this gas corresponds to the vapor pressure of the sulfur at 123° C., or 420 ppm by volume.

The sulfur that is formed decants at the bottom of the reactor-contactor and is extracted via the line (25) at a rate of 332 kg/h. The partially purified gas of the line (6) is sent into the exchanger (7) where it is cooled to the temperature of 75° C. After condensation of the solid sulfur on the cold walls of the exchanger, the sulfur content in the effluent of the line (8) is 15 ppm, whereby its flow rate is 12,214 Nm³/h.

The deposition speed of sulfur into the exchanger (7) is 10 kg of sulfur/h. When the pressure loss in the latter reaches 30 mbar, the exchanger (7) is bypassed by using the exchanger (9) in an alternative way, which makes it possible to maintain the sulfur content of the gas effluent that is extracted via the line (16) at 15 ppm by volume.

For the regeneration of the exchanger (7) or (9), a portion of the solvent that is drawn off from the reactor-contactor via the line (4) is circulated in the exchanger for four hours according to the diagram of FIG. 4. The flow rate of the solvent that is used is 10 m³/h, whereby the latter is injected into the exchanger via the line (18) so as to melt the accumulated sulfur. The solvent-liquid sulfur mixture is evacuated via the line (17) and reinjected into the decanting zone of the reactor-contactor via the pump (11) and the line (12).

The compositions of the input and output gases of the unit are provided in the following table:

| Component | Input Gas Line (3) | Output Gas Line (6) | Output Gas Line (8) |
|---|---|---|---|
| $H_2S$ (% by Volume) | 1.234 | 0.014 | 0.014 |
| $SO_2$ (% by Volume) | 0.617 | 0.007 | 0.007 |
| $CO_2$ (% by Volume) | 4.000 | 4.038 | 4.040 |
| COS (% by Volume) | 0.015 | 0.009 | 0.009 |
| $CS_2$ (% by Volume) | 0.015 | 0.009 | 0.009 |
| $S_v$* (% by Volume) | 0.1400 | 0.042 | 0.0015 |
| $N_2$ (% by Volume) | 60.000 | 60.396 | 60.421 |
| $H_2O$ (% by Volume) | 34.000 | 35.384 | 35.398 |
| Sum of the Sulfur Compounds (Counted in Sulfur) (% by Volume) | 2.036 | 0.090 | 0.036 |
| Total Sulfur (kg/h) | 357 | 16 | 6 |

*$S_v$ = vapor sulfur + vesicular sulfur (liquid sulfur entrained in the input gas)

In the process according to the invention, the yield of recovery of the sulfur compounds in the reactor is equal to:

Total input sulfur(line 3)(kg/h)−total output sulfur(line 8)(kg/h)·100/total output sulfur(kg/h)=(357−6)/357*100=98.3% by weight In the process according to the prior art, the yield of recovery of the sulfur compounds in the reactor is equal to:

Total input sulfur(line 3)(kg/h)−total output sulfur(line 6)(kg/h)·100/total output sulfur(kg/h)=(357−16)/357*100=95.5% by weight These results imply that in the case of a concatenation of Claus units (with a sulfur yield of 94%)+tail gas treatment according to the process of the invention, the overall sulfur recovery yield is:

$$94 + \frac{6 \times 98.3}{100} = 99.90\% \text{ by weight}$$

For a Claus concatenation (with a sulfur yield of 94%)+tail gas treatment according to the prior art, the overall sulfur recovery yield is:

$$94 + \frac{6 \times 95.5}{100} = 99.73\% \text{ by weight}$$

Consequently, by the implementation of the process according to the invention, the overall sulfur recovery yield of the Claus chain+tail gas treatment is improved by 0.17% by weight.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application Ser. No. 09/00451, filed Feb. 2, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for the treatment of a gas that contains hydrogen sulfide and sulfurous anhydride comprising the following stages:
    a) The gas (3) is brought into contact with an organic solvent (1) that contains a sulfur forming catalyst in at least one gas-liquid reactor-contactor (2); a gas effluent that contains vapor sulfur and liquid sulfur stream (25) are recovered separately,
    b) Said gas effluent is introduced, in indirect contact with a cooling fluid into a first condensation zone (7) that operates at a temperature of between 70 and 100° C. so that the sulfur that is contained in said gas effluent is deposited in solid form on relatively cold walls of the equipment of the zone (7), said cooling fluid used in the first condensation zone being from fluid used for cooling the organic solvent, the latter being extracted, cooled, and then recycled to the reactor-contactor,
    c) When the clogging limit of said equipment of zone (7) is reached, said equipment is regenerated by passing hot organic solvent extracted from said at least one gas-liquid reactor-contactor so as to melt the solid sulfur that is deposited inside said equipment to obtain an organic solvent and liquid sulfur effluent,
    d) Said organic solvent liquid sulfur effluent is recycled to the reactor-contactor, where said liquid sulfur is decanted and removed,
    e) A purified gas that contains less than 30 ppm by volume of sulfur is extracted from the zone (7), and
    f) A second condensation zone (9) is implemented and operates in parallel and alternatively with the zone (7) when the latter is in regeneration phase (stage c), and vice versa.

2. Process according to claim 1, in which the regeneration phase is triggered when the pressure loss in the condenser on the part of the gas effluent reaches a limit value of between 10 and 200 mbar.

3. Process according to claim 2, in which the regeneration phase is triggered when the pressure loss in the condenser on the part of the gas effluent reaches a limit value of between 10 and 100 mbar.

4. Process according to claim 3, in which the regeneration phase is triggered when the pressure loss in the condenser on the part of the gas effluent reaches a limit value of between 10 and 30 mbar.

5. Process according to claim 1, in which in stage b), said gas effluent is cooled to a temperature of between 75 and 85° C.

6. A process according to claim 1, wherein in step (b) said gas effluent is passed into a calander of a tubular heat exchanger.

7. A process according to claim 1, wherein said purified gas from step (e) contains about 15 ppm by volume of sulfur.

* * * * *